United States Patent
Kirsch et al.

(10) Patent No.: US 9,769,563 B2
(45) Date of Patent: Sep. 19, 2017

(54) AUDIO ENHANCEMENT VIA OPPORTUNISTIC USE OF MICROPHONES

(71) Applicant: HARMAN INTERNATIONAL INDUSTRIES, INC., Stamford, CT (US)

(72) Inventors: James M. Kirsch, Salt Lake City, UT (US); Brant D. Thomsen, Sandy, UT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 46 days.

(21) Appl. No.: 14/806,625

(22) Filed: Jul. 22, 2015

(65) Prior Publication Data
US 2017/0026740 A1  Jan. 26, 2017

(51) Int. Cl.
*H04R 3/00* (2006.01)
*H04R 1/40* (2006.01)
*H04M 3/56* (2006.01)

(52) U.S. Cl.
CPC ............ *H04R 1/406* (2013.01); *H04M 3/568* (2013.01); *H04R 3/005* (2013.01); *H04M 2203/509* (2013.01)

(58) Field of Classification Search
CPC ........ H04R 1/326; H04R 1/406; H04R 3/005; H04R 2201/40; H04R 2201/405; H04R 2420/07; H04M 9/082; H04M 3/568; H04M 2203/509; G10K 11/1784; G10L 21/0208
See application file for complete search history.

(56) References Cited

U.S. PATENT DOCUMENTS

| | | | | |
|---|---|---|---|---|
| 3,437,758 A | * | 4/1969 | Clement ................ | H04M 3/56 379/206.01 |
| 5,787,183 A | * | 7/1998 | Chu ...................... | H04R 1/406 379/202.01 |
| 2012/0224456 A1 | | 9/2012 | Visser et al. | |
| 2013/0022216 A1 | | 1/2013 | Ganong, III et al. | |
| 2016/0302006 A1 | * | 10/2016 | Pandey ................. | H04R 3/005 |

FOREIGN PATENT DOCUMENTS

WO   2014204999 A2   12/2014

OTHER PUBLICATIONS

Extended European Search Report Application No. 16178303.0, dated Dec. 12, 2016, 9 pages.

* cited by examiner

*Primary Examiner* — Andrew L Sniezek
(74) *Attorney, Agent, or Firm* — Artegis Law Group, LLP

(57) ABSTRACT

An audio processing system includes a group of microphones associated with a dynamic network of microphones and a receiver. The receiver is configured to identify a first signal received by a microphone in the plurality of microphones that is designated as a primary microphone, and identify a subset of microphones included in the plurality of microphones, where each microphone in the subset is associated with a respective signal corresponding to the first signal. The receiver is further configured to calculate a weighting factor for each microphone included in the subset based on the first signal and the respective signal and opportunistically establish a connection with a microphone associated with the dynamic network of microphones that is not included in the plurality of microphones; and, based on a signal received from this microphone, adjust a weighting factor for at least one of the microphones in the subset.

22 Claims, 3 Drawing Sheets

AUDIO ENHANCEMENT VIA OPPORTUNISTIC USE OF MICROPHONES

BACKGROUND

Field of the Embodiments of the Present Disclosure

Embodiments of the present disclosure relate generally to audio signal processing and, more specifically, to audio enhancement via opportunistic use of microphones.

Description of the Related Art

Audio enhancement is often used to improve the ability of specific individuals to hear particular people speaking or other sound sources in a group setting, such as a group meeting in a conference room. In one example, and without limitation, a hearing impaired participant could listen to the person speaking via hearing aids or similar listening devices placed into one or both ears of the participant. Such hearing aids would typically have a built-in microphone to receive sound present in the region of the outer ear, and an amplifier and speaker for the purpose of amplifying sounds and projecting the amplifies sounds into the inner ear. In another example, and without limitation, a remote participant could listen to the person speaking via a speakerphone or other teleconference device. Such devices receive sound from within the conference room via a microphone, convert the received sound into an electrical signal, and transmit the electrical signal to a remote teleconference device. The remote teleconference device processes the electrical signal and transmits the output to a speaker or other listening device so that the remote participant can hear sounds within the conference room.

One problem with the above approaches is that the microphone for the hearing aid or teleconference device is typically remote from person speaking. That is, the microphone of a hearing aid is typically embedded into the hearing aid itself, which is placed into the ear of the participant. Likewise, the microphone of a teleconference device is typically embedded into the teleconference device, which is oftentimes placed in the center of the conference room, such as on the main conference table within the conference room. In both cases, the location of the microphone is typically a significant distance from the person speaking within the room given that the person speaking is usually located on one side of the room or at one end of the conference room table. Generally, the quality of the audio received at a microphone degrades as the distance between the microphone and the source of interest increases. Another problem with the above approaches is that such devices typically amplify all sounds relatively equally. As a result, a listener may have difficulty hearing a particular source of interest, such as the voice of a particular person speaking, particularly in the presence of other audio sources in the environment, such as noise and sidebar conversations.

One solution to these problems is to place a wired or wireless remote microphone in closer proximity to the lecturer. For example, a wireless microphone associated with a hearing aid could be placed near the person speaking. In another example, a wired or wireless "puck" style microphone associated with a teleconference device could likewise be placed on the conference room table or in some other location close to the person speaking.

One drawback with these solutions is that the location of the person speaking or other sound source is subject to change over time. In one example, the person speaking could walk or otherwise move from a location near the remote microphone to a location that is distant from the remote microphone. In another example, the sound source could change from the person speaking to another person, who interrupts to ask a question or interject a comment, or to a content player that plays back media content, such as an audio or audiovisual segment. In such cases, both the main microphone and the remote microphone could be relatively far away from where a new person is speaking or where a new sound source is located. Another drawback with the above solutions is that a hearing impaired individual has to suffer the embarrassment of presenting and placing a remote microphone in the room, which can identify that person to the broader group as a hearing impaired individual.

As the foregoing illustrates, new techniques for enhancing audio for certain individuals in group settings would be useful.

SUMMARY

One or more embodiments set forth include an audio processing system that includes a group of microphones associated with a dynamic network of microphones and a receiver. The receiver is configured to identify a first signal received by a microphone included in the plurality of microphones that is designated as a primary microphone. The receiver is further configured to identify a subset of microphones included in the plurality of microphones, wherein each microphone in the subset of microphones is associated with a respective signal that corresponds to the first signal. The receiver is further configured to calculate a weighting factor for each microphone included in the subset of microphones based at least in part on the first signal and the respective signal. The receiver is further configured to establish a connection with a first microphone associated with the dynamic network of microphones that is not included in the plurality of microphones. The receiver is further configured to adjust a weighting factor for at least one of the microphones included in the subset of microphones based on a signal received from the first microphone.

Other embodiments include, without limitation, an audio receiver that implements one or more aspects of the disclosed techniques, and a computer readable medium including instructions for performing one or more aspects of the disclosed techniques, as well as a method for performing one or more aspects of the disclosed techniques.

At least one advantage of the approach described herein is that audio is enhanced for listeners with respect to a particular source of interest in that microphones placed closer to the source of interest have a stronger influence on the mixed audio signal than microphones that are farther away. Another advantage of the approach described herein is that performance and quality of the sound is improved as additional wireless microphones are detected and added into the dynamic mix.

BRIEF DESCRIPTION OF THE SEVERAL VIEWS OF THE DRAWINGS

So that the manner in which the recited features of the one more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosure subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

As further described herein, an audio processing system enables one or more listeners to hear a dynamic mix of multiple microphones that are networked together via an ad hoc network configuration. The specific set of microphones that contribute to the dynamic mix opportunistically changes as conditions change. As other listeners arrive with wireless devices that include one or more microphones, these additional microphones are added to the network configuration. That is, microphones are opportunistically added into the dynamic mix as such microphones become available. As listeners leave, along with their wireless devices, the microphones associated with those devices are removed from the dynamic mix. In addition, microphones are opportunistically added or removed from the set of microphones that contribute to the dynamic mix based on various changing conditions, including, without limitation, a microphone or device being powered up or down, a change in location of a source of interest (such as when a speaker moves), a change in location of a microphone or device, and network congestion resulting in a signal delay from one or more microphones or devices. In other words, the quantity of microphones and associated devices connected to the audio processing system varies over time, as does the quantity of connected microphones and associated devices that contribute to the dynamic mix.

The connected microphones are ranked to determine a primary microphone. Further the multiple microphones are time-aligned in order to reinforce one or more sources of interest. The time-alignment and mix of microphones vary dynamically in response to changing acoustic conditions, including, without limitation, change in the quantity and position of microphones, changes in location of the source of interest, change from one source of interest to another, and changes in the listener's body position or head orientation. The signals from the multiple microphones are time-aligned with respect to the source of interest to reduce the potential for acoustic phase interference.

System Overview

Figure 1:
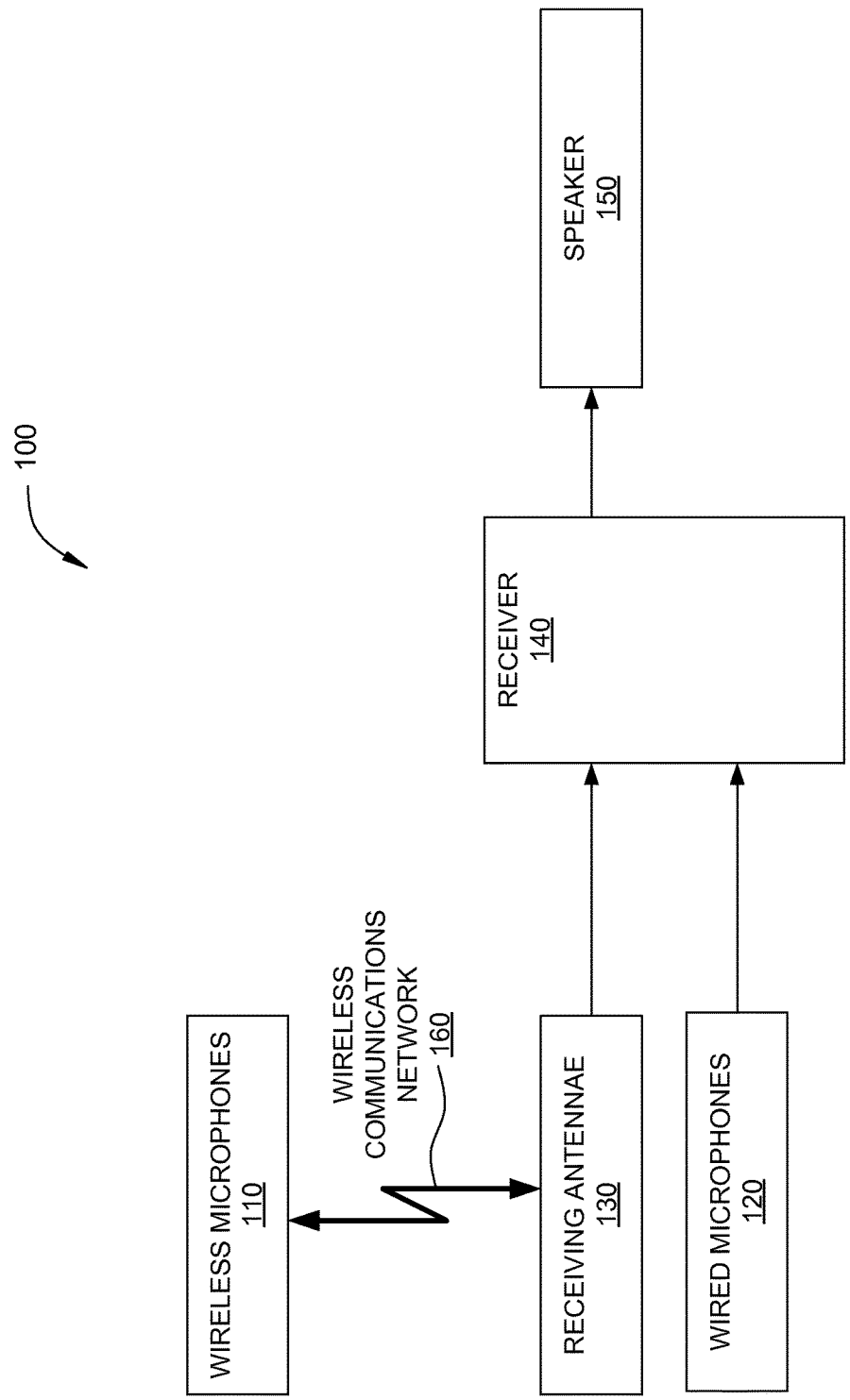
FIG. 1 illustrates an audio processing system configured to implement one or more aspects of the various embodiments.

FIG. 1 illustrates an audio processing system 100 configured to implement one or more aspects of the various embodiments. As shown, the audio processing system 100 includes, without limitation, wireless microphones 110, wired microphones 120, antennas 130, a receiver 140, and a speaker 150. In various embodiments, audio processing system 100 may be a personal device, such as a headset worn by a particular listener, or a shared device, such as a speaker phone or other teleconference device.

Wireless microphones 110 include any audio receiving device configured to receive acoustic signals from the environment, convert the received acoustic signals into a digital signal, and transmit the digital signal via a transmitting antenna to a receiver, such as receiver 140. In various embodiments, each of the wireless microphones 110 may be in any technically feasible form including, without limitation, a microphone of a mobile telephone, a microphone of a laptop or tablet computer, and a microphone built into another device, such as a pen, a puck-shaped object, or television remote control. Any one or more of the wireless microphones 110 may be attached to or embedded into a wall, a ceiling, a conference room table, or other surface. Any one or more of the wireless microphones 110 may be unattached to any particular surface. Such unattached wireless microphones 110 may reside in a particular room or space or may be transported as needed by, for example, a participant in a meeting. Any one or more of the wireless microphones 110 may be associated with another device or appliance that has a wireless communications capability, including, without limitation, an appliance, a security alarm, and an environment controller such as a thermostat. The wireless microphones 110 are configured to communicate over a wireless communications network 160 with other wireless microphones 110 and with receiver 140. In some embodiments, wireless microphones 110 communicate over wireless communications network 160 to receiving antennae 130, and receiving antennae 130, in turn communicate with receiver 140.

Wired microphones 120 are optionally included in audio processing system 100. Wired microphones 120 attach to receiver 140 via a cable, speaker wire, or other physical connection. Any one or more of the wired microphones 120 may be attached to or embedded into a wall, a ceiling, a conference room table, or other surface. Alternatively, wired microphones 120 associated with a personal listening device may be embedded into headphones or a headset worn by the listener.

The total quantity of wireless microphones 110 and wired microphones 120 (referred to collectively herein as "microphones 110 and 120") varies over time, based on the quantity of microphones 110 and 120 within the range of or connected to receiver 140. Wireless microphones 110 are determined to be in range of receiver 140 based on a combination of proximity to receiver 140, ability to form a wireless connection with receiver 140, and level of audio contribution relative to other in-range wireless microphones 110. Each microphone 110 and 120 is typically associated with a particular location, such as a conference room, or with a particular listener, as with a personally-owned wireless microphone 110.

In some embodiments, a wired or wireless device (not explicitly shown) configured to form a connection with receiver 140 may have two or more associated microphones 110 and 120. Such a wireless device may improve spatial filtering, also referred to herein as beamforming, by receiver 140 in order to take advantage of the orientation of such devices. Wireless devices with multiple microphones 110 and 120 may be aimed or steered toward a source of interest to provide better capability to emphasize the source of interest and deemphasize other sources in the environment.

In some embodiments, one or more microphones 110 and 120 may include a built-in processor, including, without limitation, a central processing unit (CPU), a digital signal processor (DSP), and a microcontroller. Such a built-in processor may perform various operations associated with the microphone, including, without limitation, equalization, noise reduction, audio dynamic range compression, and data compression.

Receiving antennas 130 receive signals transmitted by various wireless devices, such as wireless microphones 110. In turn, receiving antennas 130 transmit the received signals to receiver 140 for processing. Depending on the quantity of receiving antennas 130, the location of wireless microphones 110 are determined by receiver 140.

If wireless microphones 110 are placed in a plane, such as a horizontal plane, then receiver 140 is able to determine the angle of arrival from a wireless microphone 110 if there are two or more receiving antennae 130. Receiver 140 is additionally able to determine the range or distance of a wireless microphone 110 if there are three or more receiving antennae 130. Additional quantities of antennae improve accuracy of angle of arrival and range calculations. In one example, in a two ear receiver system, such as a headset, two antennae per ear could be used to resolve arrival angle and range.

If wireless microphones 110 are not placed in a plane, but rather exist in a three-dimensional volume, then receiver 140 is able to determine a surface or plane on which a wireless microphone 110 is located if there are two or more receiving antennae 130. Receiver 140 is able to determine the line along which a wireless microphone 110 is located if there are three or more receiving antennae 130. Receiver 140 is able to determine the point at which a wireless microphone 110 is located if there are four or more receiving antennae 130. Additional quantities of antennae improve accuracy of angle of arrival and range calculations. In one example, in a two ear receiver system, such as a headset, two antennae per ear could be used to resolve arrival angle and range. If packets from some or all of wireless microphone 110 transmitters are synchronized, then range and angle estimation is further improved, and fewer receiving antennae 130 are needed for accurate calculations.

Receiver 140 performs various audio processing operations on signals received from wireless microphones 110, wired microphones 120, and receiving antennas 130. In various embodiments, receiver 140 may be a state machine, a central processing unit (CPU), digital signal processor (DSP), a microcontroller, an application-specific integrated circuit (ASIC), or any device or structure configured to process data and execute software applications.

One operation performed by receiver 140 is a proximity operation to determine strength, and thereby, the distance or location of each microphone. Receiver 140 employs one or more of triangulation techniques, signal strength, and GPS data to perform the proximity operation.

Another operation performed by receiver 140 is a localization operation to determine off-axis angle of each microphone. Receiver 140 employs one or more methods, including, without limitation, triangulation techniques, delay calculations, wireless localization techniques and GPS data localization techniques to perform the localization operation.

Yet another operation performed by receiver 140 is combination or mixing of microphone signals. Receiver 140 assigns weights to each microphone signal, where the weights are dynamically determined by the off-axis angle relative to the listener's face and proximity of each microphone. Receiver 140 performs beamforming, or spatial filtering, operations to focus the received direction of sound. Receiver 140 further performs selection and mixing of all or a portion of the microphones 110 and 120 based on the computed weights. Receiver 140 further performs coherence estimates to reinforce signals that are present only on multiple microphones 110 and 120, and suppresses signals present only on a single microphone.

In some embodiments, receiver 140 may be associated with an audio processing system 100 that is a personal device worn by a particular listener. In such embodiments, receiver 140 may perform a steering function so that, when the listener turns to face a different talker, the microphone signals received from wireless microphones 110 and wired microphones 120 may be dynamically weighted to focus the pickup pattern in the direction the listener is facing.

In other embodiments, receiver 140 may be associated with an audio processing system 100 that is shared by several listeners, as in the case of a speakerphone or other teleconference device. In such embodiments, receiver 140 may also perform certain other operations described herein, including, without limitation, determining off-axis angles of microphones 110 and 120, proximity detection, mixing, and coherence estimation.

In operation, receiver 140 identifies corresponding signals received from two or more microphones 110 and 120, time aligns the corresponding signals, calculates a weighting factor for each of the corresponding signals, and mixes or combines the corresponding signals according the calculated weighting factors. In various embodiments, receiver 140 may perform these functions via cross-correlation techniques. In these embodiments, receiver 140 may first select a microphone against which to cross-correlate other microphones 110 and 120 in communication with receiver 140. Selecting a microphone prior to performing cross-correlation reduces the total number of cross-correlation operations. If a microphone is not selected prior to cross-correlation, the number of cross-correlation operations needed is given by $N*(N-1)$, where N is the number of microphones 110 and 120. If a microphone is selected prior to cross-correlation, then the number of cross-correlation operations is reduced to $N-1$. So, for example, if receiver 140 is in communication with 10 microphones 110 and 120, then selecting a microphone prior to cross-correlation could reduce the number of cross-correlation operations from 90 to 9.

Receiver 140 selects a microphone either by defining a reference microphone or by determining a primary microphone. Receiver 140 defines a reference microphone by selecting a particular microphone that has a known latency and quality. For example, receiver 140 could select a relatively high-quality wired microphone placed in the center of a room as the reference microphone. During cross-correlation, all other microphones 110 and 120 would be cross-correlated to the reference microphone.

Alternatively, receiver 140 determines which of the microphones 110 and 120 is the primary microphone at a particular point in time. The microphone determined to be the primary microphone is the selected microphone. During cross-correlation, all other microphones 110 and 120 are cross-correlated to the primary microphone.

Receiver 140 performs one or more operations to determine the primary microphone. In one example, receiver 140 could analyze the amplitude of each microphone, and select the microphone that presents the loudest (highest amplitude) signal for a threshold amount of time as the primary microphone. In this example, the microphone presenting the loudest signal is presumed to be nearest to the source of interest, such as a main speaker. This approach typically works well, unless the main speaker has a pocket microphone which presents a lower volume but is physically nearer to the speaker.

In another example, receiver 140 could perform a first cross-correlation pass of all other microphones 110 and 120 against the reference microphone. Receiver 140 selects the microphone whose cross-correlation to the reference microphone presents the earliest peak of the signal present in the reference microphone. In this example, the microphone presenting the source of interest at the earliest point in time is presumed to be nearest to the source of interest. This approach typically works well unless there is significant noise or a loud sidebar conversation.

In another example, receiver 140 could perform a full set of N*(N−1) cross-correlation operations without preselecting a microphone. Receiver 140 would then select the microphone that presents the earliest signal peak that is also present in a threshold number of microphones 110 and 120. This approach works well to find the predominantly present source of interest, although this approach is more computationally intensive then the other approaches described above.

In another example, multiple fixed microphones 110 and 120 could be placed in a pool of candidate primary microphones 110 and 120. In such embodiments, receiver 140 designates a subset of microphones 110 and 120, such as three, to be the set of microphones 110 and 120. Typically, the candidate primary microphones 110 and 120 are fixed, higher quality microphones 110 and 120 placed in appropriate locations in the room. Receiver 140 performs a cross-correlation among the microphones 110 and 120 in the pool of candidate primary microphones 110 and 120. The primary microphone is then selected from the pool based on the results of the cross correlation.

After selecting a primary microphone, receiver 140 performs cross-correlation of all microphones 110 and 120 to the primary microphone. Receiver 140 assigns higher weighting factors to microphones 110 and 120 that strongly correlate to the primary microphone. Receiver 140 assigns correspondingly lower weighting factors to microphones 110 and 120 that weakly correlate to the primary microphone. Receiver 140 may use any technically feasible cross-correlation approach, including, without limitation, convolution and pattern recognition. In some embodiments, in order to simplify the cross-correlation operation, receiver 140 may limit the time window in which to search for a correlated signal to the primary microphone. For example, if the maximum distance between microphones 110 and 120 is known to be 33 feet, corresponding to 30 ms, and the maximum tolerable latency due to wireless transmission is 10 ms, receiver examines a 40 ms window to find correlation between the primary microphone and each of the other microphones 110 and 120. If a particular microphone does not correlate to the primary microphone within a 40 ms window, either the microphone did not pick up the signal or the microphone is experiencing a wireless transmission delay in excess of the 10 ms limit.

In various embodiments, receiver 140 may perform additional operations to adjust the weighting factors determined during cross correlation. In one embodiment, receiver 140 may compensate for differences in loudness among the microphones 110 and 120. Receiver 140 may raise the weighting factor for a microphone that presents a louder signal and lower the weighting factor for a microphone that presents a quieter signal. In one embodiment, receiver 140 may compensate for timing differences between a microphone and the primary microphone. Receiver 140 may raise the weighting factor for a microphone that presents a signal that is closer in time to the primary microphone, under the presumption that the microphone is closer to the primary microphone. Receiver 140 may lower the weighting factor for a microphone that presents a signal that is farther away in time to the primary microphone, under the presumption that the microphone is farther away from to the primary microphone.

In another embodiment, receiver 140 may compensate for differences in latency among the microphones 110 and 120 due to wireless transmission. Wired microphones 120 may have delay related only to acoustic delay of the room and wire transmission time. Wireless microphones 110 may incur varying latency due to the process of digitizing, packetizing, and transmitting digital audio packets to receiver 140. For example, given that the speed of sound is 1127 feet/second (that is, a little over one foot per millisecond), a latency of 11 ms due to wireless transmission is consistent with 11 feet of distance. Therefore, in order to better estimate distance, receiver 140 may compensate for wireless transmission delay when determining weighting factor based on distance from the source of interest.

In another embodiment, receiver 140 may perform coherence estimates tests in addition to determining the earliest or loudest peak value among the microphones 110 and 120. In this embodiment, signal characteristics, such as shape, bandwidth, and other metrics, are compared among microphones 110 and 120 to better determine if two microphones 110 and 120 have picked up the same source. Stronger coherency may increase the weighting factor while weaker coherency may decrease the weighting factor.

In another embodiment, receiver 140 may measure microphone movement. Receiver 140 may detect that a microphone is moving rapidly, such as when someone is twirling a pen or rapidly moving some other device with a built-in microphone. If receiver 140 detects that a microphone is experiencing rapid movement, receiver 140 may correspondingly reduce the weighting factor for that microphone.

In another embodiment, receiver 140 may adjust weighting factors due to differences in microphone sensitivity rating. A highly sensitive microphone may report a false higher volume level versus a less sensitive microphone when exposed to the same sound wave at the same distance. In such cases, the more sensitive microphone receiver 140 may be assigned a higher weighing factor to the more sensitive microphone based on the higher reported volume. If receiver 140 has data on the sensitivity of the microphones 110 and 120 in the environment, then receiver may adjust weighting factors based on varying sensitivity of the microphones 110 and 120.

In another embodiment, receiver 140 may perform a triangulation operation to create a rough map of where all the microphones 110 and 120 are placed in the room. Receiver 140 instructs each microphone to emit an ultrasonic signal that is received by other microphones 110 and 120. The other microphones 110 and 120 note the time at which the ultrasonic signal is received. The process is repeated for each of the other microphones 110 and 120. From this data, receiver 140 performs a triangulation to convert the signal delay times to distances, and then create a triangulation map of the microphone placement. After selecting a primary microphone, as described herein, receiver 140 may use the triangulation map to determine which other microphones 110 and 120 are nearest to the primary microphone. Receiver 140 could increase the weighting factor for nearer microphones 110 and 120 and decrease the weighting factor of more distant microphones 110 and 120.

In another embodiment, receiver 140 could perform a multi-dimensional weighting operation. As one example, receiver 140 could create weighting factors based on both a time dimension and a volume dimension. Receiver 140 would assign a higher weighting factor to a microphone that present a signal that is both early and loud. Receiver 140 would assign medium weighting factors to microphones 110 and 120 that present a signal that is either early and soft or late and loud. Receiver 140 would assign a lower weighting factor to a microphone that presents a signal that is both late and soft.

After determining and adjusting the weighting factors, receiver 140 determines which microphones 110 and 120 to mix into the final output. In one embodiment, receiver 140 may mix all microphones 110 and 120 together, where the weighting factor determines the contribution of each microphone to the mix. Alternatively, receiver 140 may eliminate microphones 110 and 120 that have a weighting factor below a particular threshold. Receiver 140 then time-aligns the signals of the microphones 110 and 120 in the mix. For example, if microphone A is correlated to the primary microphone, but is delayed by 20 ms relative to the primary microphone, then receiver 140 time-aligns the signals by delaying the primary microphone signal by 20 ms. By time-aligning the microphones with respect to the source of interest, receiver 140 reduces the potential for acoustic phase interference. Once all microphone signals are time-aligned, receiver 140 performs a mix on the time-aligned microphone signals according to the weighting factors.

Speaker 150 includes one or more speakers that receive an audio signal from receiver 140 and emit a corresponding sound to one or more users. If audio processing system 100 is a personal device, then speaker 150 may be embedded into headphone or headset that projects sound into the ear of a particular listener. If audio processing system 100 is a shared device, then speaker 150 may be embedded in a second remote teleconference device that receives a signal from the main teleconference device and emits sound to one or more remotely located listeners.

Wireless communications network 160 includes any one or more wireless communications network technologies configured to wirelessly connect wireless microphones 110 and other devices with receiver 140, including, without limitation, wireless Ethernet and Bluetooth. In one embodiment, wireless communications network 160 may be configured similar to a star network except that multiple receivers are allowed. In another embodiment, wireless communications network 160 may be configured similar to the inverse of a geocasting network since receiver 140 determines the location of the transmitters, such as wireless microphones 110, rather than the other way around. As more wireless microphones 110 establish connections with wireless communications network 160, the mesh density of wireless communications network 160 increases, resulting in improved signal-to-noise ratios (SNRs) when combining signals from wireless microphones 110. In some embodiments, wireless communications network 160 may be configured to allow wireless microphones 110 to network with each other and to serve as repeaters for each other.

In some embodiments, sudden noises, such as dropping a pen or loudly placing a cup on a table, may be reduced or eliminated by setting attack and release constants. For example, setting the attack time to 20 ms would eliminate noises that are shorter than 20 ms while permitting loud sounds that are longer than 20 ms, such as speech.

Although the disclosed techniques are described in the context of a particular embodiment, various modifications and variations are possible. In one embodiment, if a microphone is at the same angle as the source of interest, but is located relatively far away from the source of interest, a receiver may not be able to correctly time-align the microphone. In another embodiment, microphones 110 and 120 that are placed too far apart may not beamform properly at higher frequencies. However, such microphones 110 and 120 may still be mixed into the final output. In yet another embodiment, a microphone placed in a listener's pocket may be estimated by receiver 140 as too far off-axis. However, such a microphone may still be a good source acoustically. In yet another embodiment, security measures may be deployed in the disclosed system to reduce the likelihood of privacy violations, such as for a nearby "bystander" who possesses a wireless microphone that should not be joined to the network. In the case of a personal wireless microphone, a hard physical switch may be used to disable the power to the wireless microphone, or to disable or mute the wireless microphone, to ensure that the wireless microphone is inactive. In another embodiment, wireless microphones 110 and/or wired microphones 120 may be deployed in environments other than a conference room. As one example, wireless microphones 110 and/or wired microphones 120 could be attached to power poles, buildings, and other infrastructure, such that the microphones 110 and 120 could network with each other and with wireless microphones 110 possessed by pedestrians. As a listener walks, runs, or cycles along a path, the microphone signals from the various microphones 110 and 120 could be dynamically weighted to focus the pickup pattern in the vicinity around the listener.

Operations of the Audio Processing System

Figure 2:
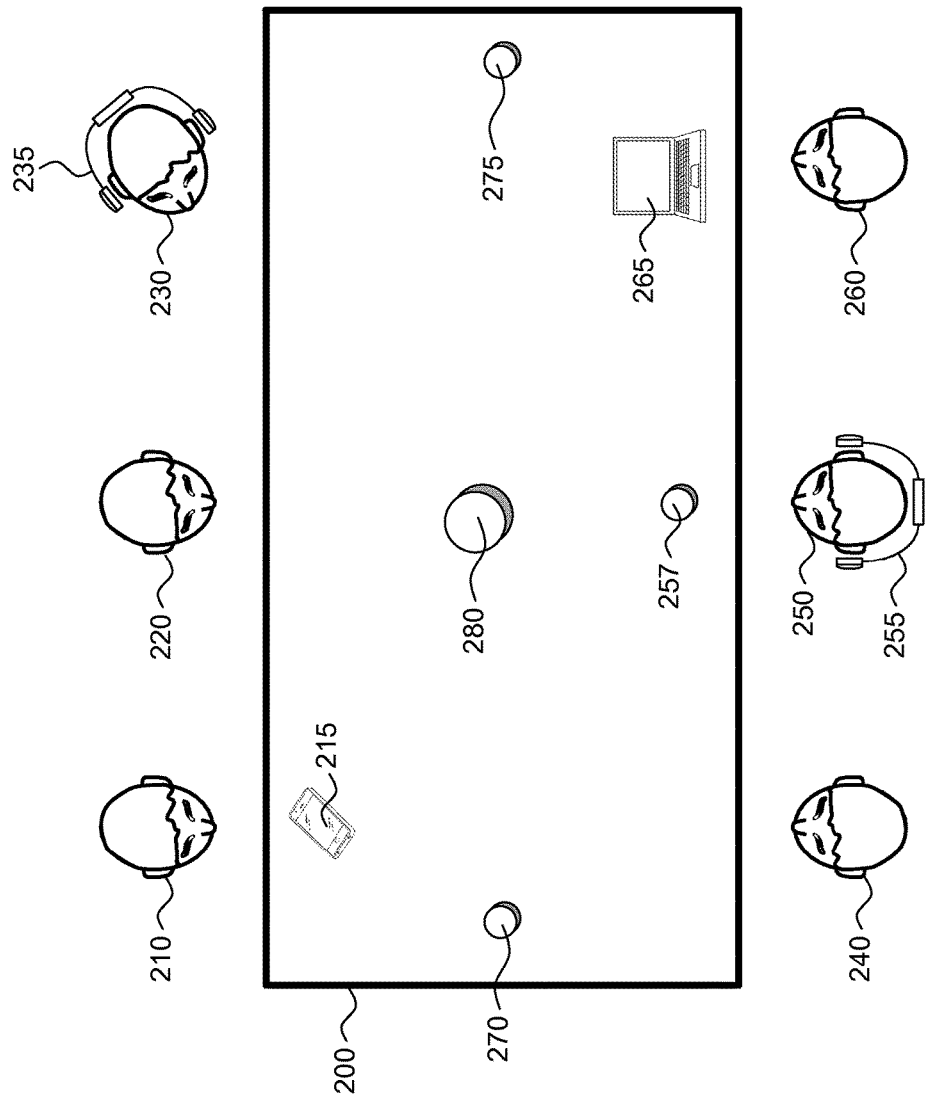
FIG. 2 illustrates an application of the audio processing system of FIG. 1, according to various embodiments.

FIG. 2 illustrates an application of the audio processing system 100 of FIG. 1, according to various embodiments. As shown, local participants 210, 220, 230, 240, 250, and 260 are participating in a conference, and their speech signals are acquired by an audio processing system 280, where audio processing system 280 is an embodiment of the audio processing system 100 of FIG. 1. Audio processing system 280 receives and processes microphone signals to transmit to remote participants (not explicitly shown). Audio processing system 280 acquires these microphone signals from various sources including, without limitation, microphones embedded into audio processing system 280 (not explicitly shown), a microphone within a cellphone 215 associated with user 210, a microphone within a laptop 265 associated with user 260, puck microphone 257 associated with user 250, and fixed microphones 270 and 275 attached to the conference table 200. The audio processing system 280 includes receiving antenna (not explicitly shown in FIG. 2) to steer audio and determine the source of interest, as further described herein. The local participants 210, 220, 230, 240, 250, and 260 also listen to the audio of the conference.

As also shown, participants 230 and 250 each have an audio processing system 235 and 255, respectively, where audio processing system 235 and 255 are also embodiments of the audio processing system 100 of FIG. 1. Audio processing systems 235 and 255 receive and process microphone signals for respective participants 230 and 250. These microphones include microphones (not explicitly shown) embedded into audio processing systems 235 and 255, a microphone within a cellphone 215 associated with user 210, a microphone within a laptop 265 associated with user 260, puck microphone 257 associated with user 250, and fixed microphones 270 and 275 attached to the conference table 200.

Audio processing systems 235 and 255 each include multiple receiving antennas (not explicitly shown) that detect position and orientation as participants 230 and 250 move and turn their heads. Audio processing systems 235 and 255 use the data from the receiving antennae to steer sound and determine the source of interest for respective participants 230 and 250 respectively. The receiving antennae data augments or overrides the source of interest determinations described herein. Because participant 230 is looking at participant 240, audio processing system 235 determines that the source of interest for participant 230 is in the direction of participant 240, even if the other techniques described herein determine that the source of interest is in a different direction. Likewise, because participant 250 is looking at participant 220, audio processing system 255 determines that the source of interest for participant 250 is in the direction of participant 220, even if the other techniques described herein determine that the source of interest is in a different direction.

Each of audio processing system 280, 235, and 255 selects a primary microphone, performs cross-correlations, calculates weighting factors, and mixes the microphone signals for remote users, user 230, and user 250, respectively. Audio processing systems 235 and 255 transmit the mixed microphone signals to one or more speakers, typically in the form of headphones or earphones. Audio processing system 280 transmits the mixed microphone signals to one or more remote speakers associated with corresponding remote teleconference devices.

Figure 3:
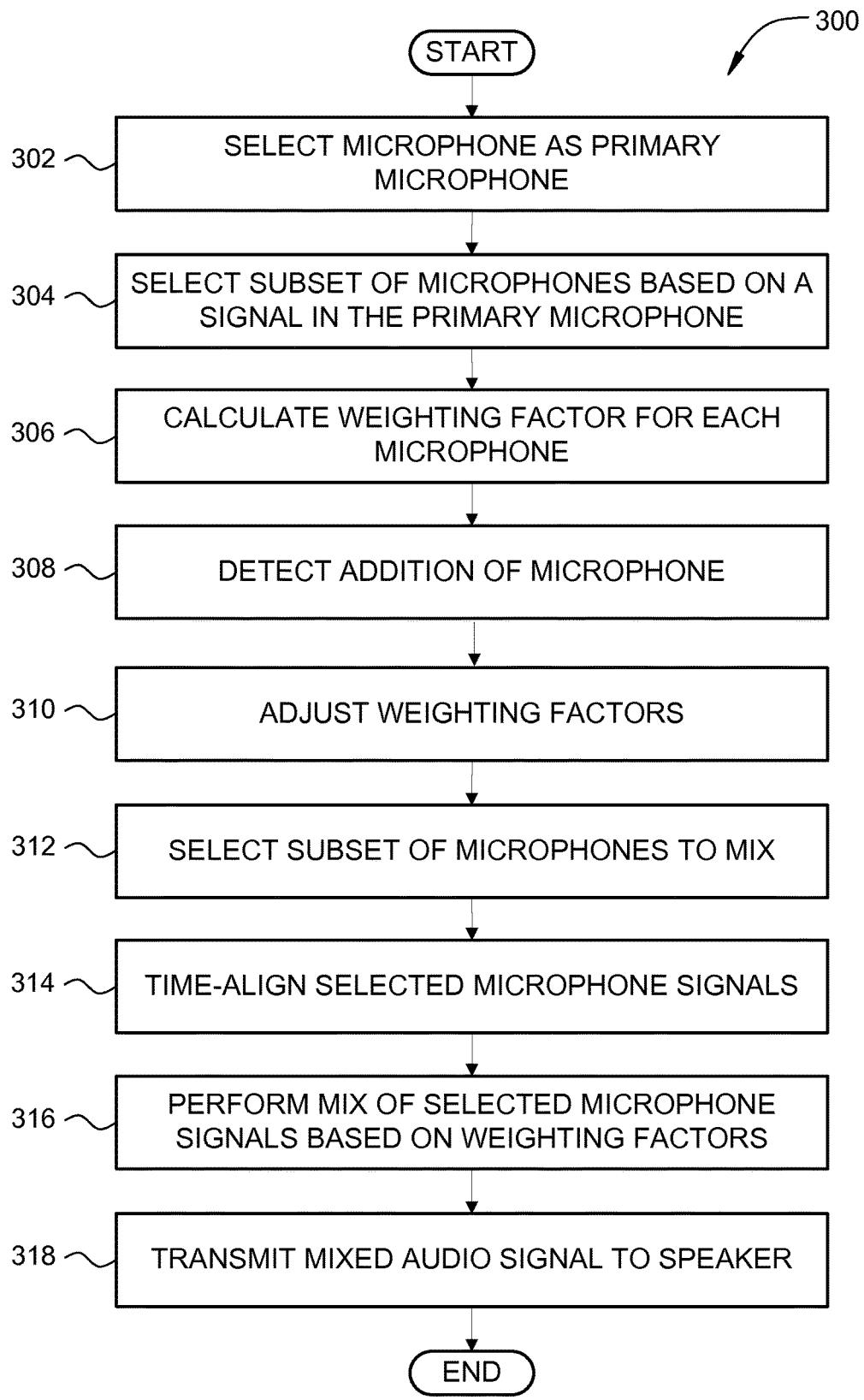
FIG. 3 is a flow diagram of method steps for enhancing audio via opportunistic use of one or more microphones, according to various embodiments.

FIG. 3 is a flow diagram of method steps for enhancing audio via opportunistic use of one or more microphones, according to various embodiments. Although the method steps are described in conjunction with the systems of FIGS. 1-2, persons skilled in the art will understand that any system configured to perform the method steps, in any order, is within the scope of the present disclosure.

As shown, a method 300 begins at step 302, where a receiver 140 associated with an audio processing system 100 that is in communication with multiple microphones selects a microphone as the primary microphone. The microphone may be a wireless microphone 110 or, alternatively, a wired microphone 120 that is coupled to receiver 140. Receiver 140 selects the microphone via any one or more of the approaches described herein, including, without limitation, selecting the microphone that presents the loudest signal, selecting the microphone that has the earliest peak level that is associated with a source of interest, performing a cross-correlation among the microphones to determine which microphone has the highest quality signal of the source of interest.

At step 304, receiver 140 selects a subset of the microphones, where each microphone in the subset of microphones has received a signal that corresponds or is associated with a signal present in the primary microphone signal. At step 306, receiver 140 calculates weighting factors for each microphone in the subset of microphones based on the signal from each microphone relative to signal from the primary microphone. At step 308, receiver 140 detects that a microphone has been added to the audio processing system 100. At step 310, receiver 140 adjusts the weighting factors for one or more microphones in the subset of microphones based on one or more additional conditions. One of these conditions is that a weighting factor for one or more microphones may be adjusted based on a signal received from the microphone that has been added to the audio processing system 100. As discussed herein, these additional conditions also include, without limitation, movement of a microphone, loudness of the signal from the microphones, distance between each microphone and the primary microphone, amount of latency due to transmission times for wireless microphones, movement of the microphones, and sensitivity of the microphones, At step 312, receiver 140 selects a subset of microphones to mix. In various embodiments, receiver 140 may select all microphones to mix, or, in the alternative, receiver 140 may select the set of microphones whose weighting factors exceed a threshold. At step 314, receiver 140 time-aligns the microphone signals for the selected set of microphones. At step 316, receiver 140 performs a mix on the time-aligned microphone signals based on the weighting factors. At step 318, receiver 140 transmits the mixed audio to one or more speakers, such as speaker 150. In various embodiments, the one or more speakers may be in the same room as receiver 140 or may be remotely located in another building, city, state, or country. The receiver 140 of the audio processing system 100 continues to perform the steps of method 300 in a continuous loop. In these embodiments, after step 318 is performed, the method 300 proceeds to step 302, described above. The steps of method 300 continue to be performed in a continuous loop until certain events occur, such as powering down the receiver 140 or the audio processing system 100.

In sum, the disclosed techniques enable one or more listeners to hear a dynamic mix of multiple microphones that are networked together via an ad hoc network configuration. As other listeners arrive with wireless devices that include one or more microphones, these additional microphones are added to the network configuration. That is, microphones are opportunistically added into the dynamic mix as such microphones become available. The multiple microphones are ranked to determine a primary microphone. Further the multiple microphones are time-aligned in order to reinforce one or more sources of interest. The time-alignment and mix of microphones vary dynamically in response to changing acoustic conditions, including, without limitation, change in the quantity and position of microphones, changes in location of the source of interest, change from one source of interest to another, and changes in the listener's body position or head orientation. The signals from the multiple microphones are time-aligned with respect to the source of interest to reduce the potential for acoustic phase interference.

At least one advantage of the approach described herein is that audio is enhanced for listeners with respect to a particular source of interest in that microphones placed closer to the source of interest have a stronger influence on the mixed audio signal than microphones that are farther away. As a result, undesirable effects, such as excessive reverberation and amplification of extraneous noise, are reduced. Listeners hear a relatively higher quality of sound associated with the source of interest, while other sounds, such as noise and sidebar conversations, are suppressed. Another advantage of the approach described herein is that performance and quality of the sound is improved as additional wireless microphones are detected and added into the dynamic mix. Audio is thereby enhanced for listeners in various settings, such as conference rooms, in a more robust and flexible manner relative to prior approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. An audio processing system, comprising:
   a plurality of microphones associated with a dynamic network of microphones; and
   a receiver coupled to the plurality of microphones and configured to:
      identify a first signal received by a microphone included in the plurality of microphones that is designated as a primary microphone;
      identify a subset of microphones included in the plurality of microphones, wherein each microphone in the subset of microphones is associated with a respective signal that corresponds to the first signal;
      calculate a weighting factor for each microphone included in the subset of microphones based at least in part on a strength of a correlation between the first signal and the respective signal associated with the microphone;
      establish a connection with a first microphone associated with the dynamic network of microphones that is not included in the plurality of microphones; and
      adjust a weighting factor for at least one of the microphones included in the subset of microphones based on a signal received from the first microphone.

2. The audio processing system of claim 1, wherein the receiver is further configured to perform a time-align operation on microphone signals received from each microphone included in the subset of microphones.

3. The audio processing system of claim 1, wherein the receiver is further configured to select, as the primary microphone, a microphone included in the plurality of microphones that outputs a signal having an amplitude greater than an amplitude of an output signal generated by each of the other microphones included in the plurality of microphones for a threshold amount of time.

4. The audio processing system of claim 1, wherein the receiver is further configured to select a primary microphone, comprising:
   pre-selecting a first microphone included in the plurality of microphones that outputs a signal having an amplitude greater than an amplitude of an output signal generated by each of the other microphones included in the plurality of microphones for a threshold amount of time; and
   selecting a second microphone included in the plurality of microphones that presents a signal portion at an earlier time than a corresponding signal portion presented by the first microphone.

5. The audio processing system of claim 1, wherein the receiver is further configured to adjust the weighting factor for a second microphone included in the subset of microphones based on a sensitivity rating of the second microphone.

6. The audio processing system of claim 1, wherein the receiver is further configured to adjust the weighting factor for a second microphone included in the subset of microphones based on detecting a motion associated with the second microphone.

7. The audio processing system of claim 1, wherein the receiver is further configured to adjust the weighting factor for a second microphone included in the subset of microphones based on a wireless transmission latency associated with the second microphone.

8. The audio processing system of claim 1, wherein the receiver is further configured to adjust the weighting factor for a second microphone included in the subset of microphones based on a distance between the second microphone and the primary microphone.

9. The audio processing system of claim 1, further comprising a plurality of receiving antennas, and wherein selecting a microphone as the primary microphone comprises:
    receiving an orientation signal from each receiving antenna included in the plurality of receiving antennas;
    calculating an orientation angle based on the orientation signals; and
    selecting the primary microphone based on the orientation angle.

10. A non-transitory computer-readable storage medium including instructions that, when executed by a processor, cause the processor to enhance audio via opportunistic use of one or more microphones included in a plurality of microphones, by performing the steps of:
    identifying a first signal received by a microphone included in the plurality of microphones that is designated as a primary microphone, wherein the plurality of microphones is associated with a dynamic network of microphones;
    identifying a subset of microphones included in the plurality of microphones, wherein each microphone in the subset of microphones is associated with a respective signal that corresponds to the first signal;
    calculating a weighting factor for each microphone included in the subset of microphones based at least in part on a strength of a correlation between the first signal and the respective signal associated with the microphone;
    establishing a connection with a first microphone that is not included in the plurality of microphones; and
    adjusting a weighting factor for at least one of the microphones included in the subset of microphones based on a signal received from the first microphone.

11. The computer-readable storage medium of claim 10, further including instructions that, when executed by the processor, cause the processor to perform the step of performing a time-align operation on microphone signals received from each microphone included in the subset of microphones.

12. The computer-readable storage medium of claim 10, further including instructions that, when executed by the processor, cause the processor to perform the step of performing a mix operation on the microphone signals from the at least a first subset of microphones based on the weighting factors to generate a mixed microphone signal.

13. The computer-readable storage medium of claim 10, further including instructions that, when executed by the processor, cause the processor to perform the step of adjusting the weighting factor for a second microphone included in the subset of microphones based on a sensitivity rating of the second microphone.

14. The computer-readable storage medium of claim 10, further including instructions that, when executed by the processor, cause the processor to perform the step of adjusting the weighting factor for a second microphone included in the subset of microphones based on detecting a motion associated with the second microphone.

15. The computer-readable storage medium of claim 10, further including instructions that, when executed by the processor, cause the processor to perform the step of adjusting the weighting factor for a second microphone included in the subset of microphones based on a wireless transmission latency associated with the second microphone.

16. The computer-readable storage medium of claim 10, further including instructions that, when executed by the processor, cause the processor to perform the step of adjusting the weighting factor for a second microphone included in the subset of microphones based on a distance between the other microphone and the second microphone.

17. A method for enhancing audio via opportunistic use of one or more microphones included in a plurality of microphones, the method comprising:
    identifying a first signal received by a microphone included in the plurality of microphones that is designated as a primary microphone;
    identifying a subset of microphones included in the plurality of microphones, wherein each microphone in the subset of microphones is associated with a respective signal that corresponds to the first signal;
    calculating a weighting factor for each microphone included in the subset of microphones based at least in part on a strength of a correlation between the first signal and the respective signal associated with the microphone;
    establishing a connection with a first microphone that is not included in the plurality of microphones; and
    adjusting a weighting factor for at least one of the microphones included in the subset of microphones based on a signal received from the first microphone.

18. The method of claim 17, further comprising performing a time-align operation on microphone signals received from each microphone included in the subset of microphones.

19. The method of claim 17, wherein calculating a weighting factor for each microphone comprises performing a cross-correlation of each of the other microphones included in the plurality of microphones relative to the primary microphone.

20. The method of claim 19, wherein performing a cross-correlation of each of the other microphones relative to the primary microphone comprises searching a time window of a microphone signal associated with the other microphone, wherein the time window is based on a first delay associated with a maximum acoustic delay between any two microphones included in the plurality of microphones.

21. The method of claim 20, wherein the time window is further based on a second delay associated with a wireless transmission latency associated with the other microphone.

22. The method of claim 17, further comprising performing a mix operation on microphone signals received from each microphone included in the subset of microphones based on the weighting factors to generate a mixed microphone signal.

* * * * *